United States Patent
Freund

(10) Patent No.: US 8,881,632 B2
(45) Date of Patent: Nov. 11, 2014

(54) CIRCULAR BLADE WITH STAND

(75) Inventor: Robert Freund, Paderborn (DE)

(73) Assignee: FREUND Maschinenfabrik GmbH & Co. KG, Paderborn (DE)

( * ) Notice: Subject to any disclaimer, the term of this patent is extended or adjusted under 35 U.S.C. 154(b) by 312 days.

(21) Appl. No.: 13/581,145

(22) PCT Filed: Feb. 8, 2011

(86) PCT No.: PCT/DE2011/075016
§ 371 (c)(1),
(2), (4) Date: Aug. 24, 2012

(87) PCT Pub. No.: WO2011/103871
PCT Pub. Date: Sep. 1, 2011

(65) Prior Publication Data
US 2012/0312139 A1  Dec. 13, 2012

(30) Foreign Application Priority Data

Feb. 26, 2010 (DE) .......................... 20 2010 000 260

(51) Int. Cl.
*B27B 27/04* (2006.01)
(52) U.S. Cl.
USPC ....................................................... 83/477.2
(58) Field of Classification Search
USPC ............. 83/471, 472, 471.2, 477.2, 483, 544, 83/545
See application file for complete search history.

(56) References Cited

U.S. PATENT DOCUMENTS

| 14,957 | A | * | 5/1856 | Gross .............................. 83/478 |
| 2,547,134 | A | * | 4/1951 | McLean ......................... 452/133 |
| 2,974,413 | A | * | 3/1961 | Williams ......................... 30/219 |
| 3,488,797 | A | * | 1/1970 | Dirks ............................. 452/149 |
| 3,829,932 | A | * | 8/1974 | Griss ............................. 452/160 |
| 3,916,482 | A | * | 11/1975 | Kvilhaug ....................... 452/152 |
| 4,109,347 | A | * | 8/1978 | Jolin ............................. 452/160 |
| 4,131,972 | A | * | 1/1979 | Yamashita .................... 452/160 |
| 4,794,273 | A | * | 12/1988 | McCullough et al. ........ 307/139 |

(Continued)

FOREIGN PATENT DOCUMENTS

| CH | 186 838 | 10/1936 |
| CH | 186838 A | 10/1936 |

(Continued)

OTHER PUBLICATIONS

BIRO Model BCC-100 Poultry Processing Machine—Part List, Installation and Operating Instructions Applicable from Serial No. 500 On, PTCT BCC-100 096-10-05-21.

*Primary Examiner* — Sean Michalski
(74) *Attorney, Agent, or Firm* — Laurence A. Greenberg; Werner H. Stemer; Ralph E. Locher

(57) ABSTRACT

A circular blade with stand for cutting and portioning animal products. The circular blade rotates about a rotational axis on a vertical cutting plane and the blade is driven by a drive motor. The device includes a horizontal working plane on which the product to be cut is supported and guided in a transverse manner in relation to the vertical cutting plane. The drive motor driving the circular blade uses an angular gear and is held in a fixed position on the stand above the circular blade so that a free working area is provided on both sides of the circular blade for the uninhibited handling of the product to be cut.

20 Claims, 4 Drawing Sheets

(56) References Cited

U.S. PATENT DOCUMENTS

Figure 1:
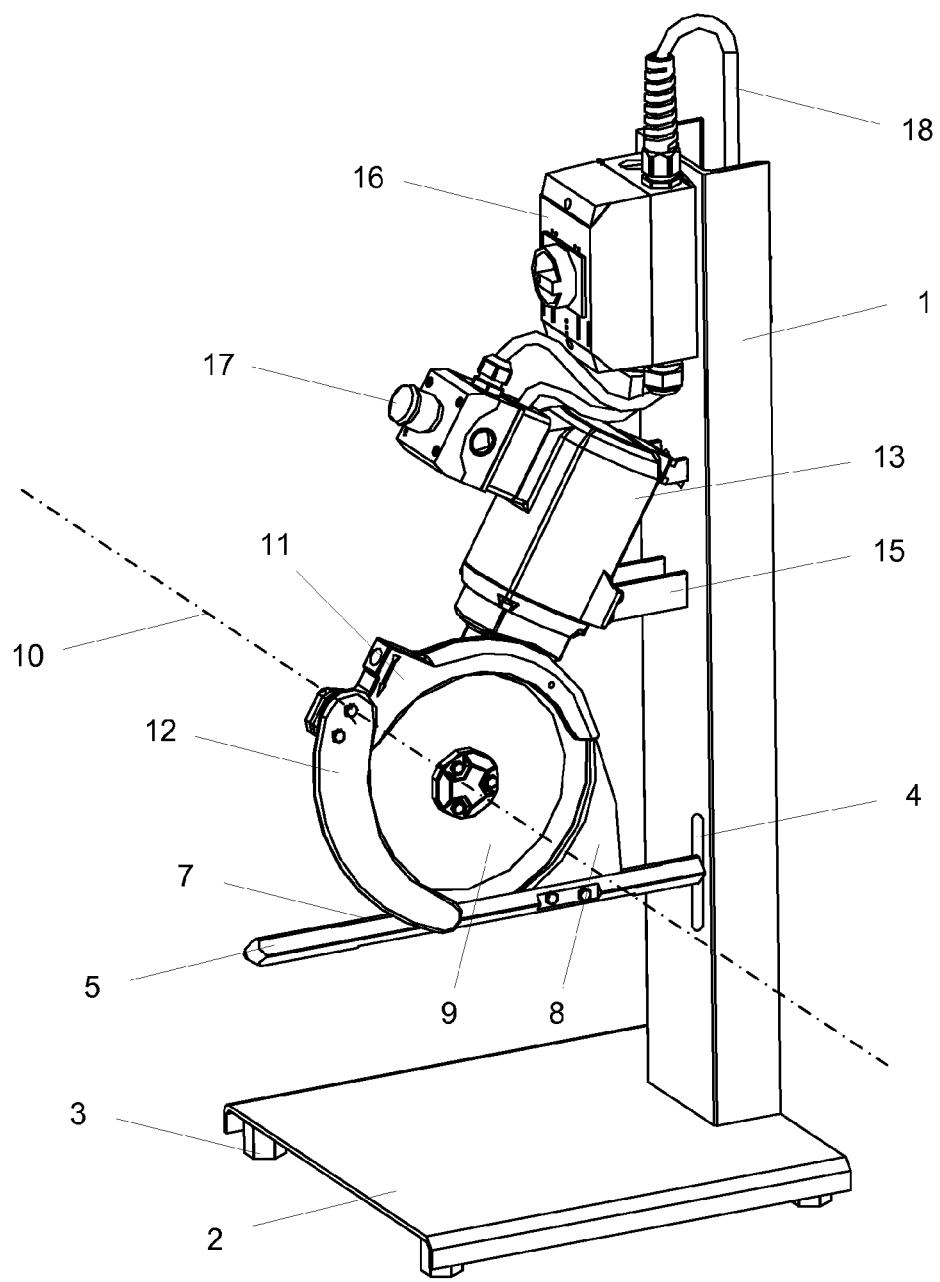

| | | | |
|---|---|---|---|
| 4,901,400 A * | 2/1990 | Karubian | 452/133 |
| 4,942,665 A * | 7/1990 | McCullough | 30/276 |
| 5,139,457 A * | 8/1992 | Rankin et al. | 452/160 |
| 5,295,897 A * | 3/1994 | Kudo et al. | 452/166 |
| 5,311,664 A * | 5/1994 | Abdul | 30/276 |
| 5,312,292 A * | 5/1994 | Rankin et al. | 452/160 |
| 5,441,445 A * | 8/1995 | Karubian et al. | 452/133 |
| 6,050,889 A * | 4/2000 | Jacobs et al. | 452/160 |
| 7,387,058 B2 * | 6/2008 | Ushiwata et al. | 83/520 |
| 7,418,894 B2 * | 9/2008 | Ushiwata et al. | 83/520 |
| 2003/0024366 A1 * | 2/2003 | Hollinger et al. | 83/473 |
| 2004/0110457 A1 * | 6/2004 | Fryer | 452/64 |
| 2004/0182215 A1 * | 9/2004 | Ushiwata et al. | 83/522.15 |
| 2007/0032185 A1 | 2/2007 | Freund et al. | |
| 2009/0025521 A1 | 1/2009 | Mammel | |
| 2009/0158907 A1 * | 6/2009 | Chiang et al. | 83/520 |
| 2011/0167977 A1 * | 7/2011 | Xu et al. | 83/471.2 |
| 2011/0290092 A1 * | 12/2011 | Ushiwata et al. | 83/471.2 |
| 2012/0006169 A1 * | 1/2012 | Oberheim et al. | 83/471.2 |
| 2012/0011978 A1 * | 1/2012 | Liu | 83/471.2 |
| 2012/0017736 A1 * | 1/2012 | Thomas et al. | 83/471.2 |
| 2012/0017737 A1 * | 1/2012 | Liu et al. | 83/471.3 |
| 2012/0097004 A1 * | 4/2012 | Marinov et al. | 83/471.2 |
| 2013/0055873 A1 * | 3/2013 | Cox | 83/471.2 |

FOREIGN PATENT DOCUMENTS

| | | |
|---|---|---|
| CH | 445 259 | 10/1967 |
| DE | 295 21 981 U1 | 3/1999 |
| DE | 29524981 U1 | 3/1999 |
| DE | 10 2004 024 077 A1 | 12/2005 |
| DE | 20 2006 007 224 U1 | 7/2007 |
| GB | 1 072 175 | 6/1967 |
| WO | 2005/020692 A2 | 3/2005 |

* cited by examiner

CIRCULAR BLADE WITH STAND

BACKGROUND OF THE INVENTION

Field of the Invention

The present invention relates to a circular blade for cutting up and portioning animal products to be cut comprising a circular blade rotating about a rotational axis on a vertical cutting plane, which is driven by a drive motor, and comprising a horizontal working plane on which the product to be cut is supported and guided in a transverse manner in relation to the vertical cutting plane.

Today, cutting systems are predominantly used, instead of the conventional band saws, for cutting poultry such as chickens, turkeys, and geese, small game and for portioning small-sized parts of pork, mutton and veal. The advantages of this widely used circular blade technology are a longer shelf life of the product due to better hygiene, since no sawdust is produced, and a constant high yield, since no sawing waste occurs. Modern circular blades have a very long service life, whereas a saw blade wears out quickly and has to be replaced. Up to several million cuts are possible before sharpening the circular blade.

A known embodiment of a circular blade is described in the patent application DE 10 2004 0240 77 A1, in which a circular blade is flanged at an angular gear which is arranged in a housing together with an electric motor, and which comprises a handle and a suspension eye. This way, the circular blade can be operated by hand or mounted on a robot. A disadvantage of this device is that manually guiding the circular blade in the cutting direction through the carcass, usually chilled to o 1 to 2 degrees Celsius, requires a considerable effort.

For cutting up poultry and the like, however, a stationary arrangement of the circular blade is required in order to guide the animal carcass firmly with both hands during the cutting process, as it is necessary for example when removing the wings at the cartilage point or when dividing in half a chicken with legs and thighs, or when removing a leg and thigh. Such a device is disclosed in the BIRO Model BCC-100 Manual and Parts List with the reference number 100-096 PTCT BCC-10-05-21. In practice, however, the very limited operating range due to the arrangement of the electric motor on one side of the circular blade has proven to be very inconvenient. This way, working with the circular blade is tiring and performance is reduced, which can lead to distraction and accidents.

Furthermore, the Manual Cut-Up Machine S3 by the company Linco is known, in which a circular blade is driven by a motor with a large gear, which considerably restricts the work area around the circular blade.

BRIEF SUMMARY OF THE INVENTION

It is the object of the invention to provide a circular blade with stand, which avoids the indicated disadvantages of the state of the art.

This object is met by the features as claimed. Embodiments of the invention are described in the dependent claims.

The invention relates to a circular blade for cutting and portioning of animal products to be cut, of the type that is typically used for splitting, halving or quartering or for removing parts such as wings, legs or head. The circular blade is driven by a drive motor in such a way that the circular blade rotates about a vertical rotational axis on a cutting plane. A horizontal working plane enables a single person to operate the blade, as the animal product to be cut is guided and supported on the working plane transverse to the vertical cutting plane.

According to the invention, the drive motor is stationarily mounted above the circular blade on a stand, so that the circular blade can be operated stationarily. The circular blade is driven via a narrow angular gear. This arrangement leaves an advantageous free working space on both sides of the circular blade for the unrestricted handling of the animal product to be cut. This way, working with the circular blade with stand is relaxed and more efficient, which guarantees high safety and excellent ergonomics.

In one embodiment, the stand is fixed on a base plate, so that the circular blade with stand can easily be placed on any work surface, which is optimal for operation, and which permits a relaxed and ergonomic working position. The arrangement of the drive motor above the work area is also a space-saving design, as the circular blade with stand requires less space.

In another embodiment, mounting the circular blade with stand at another working device is also possible. Thus, the circular blade with stand can be optimally integrated into a work process.

The stand is provided in different versions as needed. It is always designed as narrow as possible, so that even large products can be passed beside it. In a simple embodiment it can be designed as a tube. In another embodiment, the front of the stand is of triangular shape, to help dividing the product to be cut.

A particularly narrow design is a narrow plate that is oriented perpendicular to the guiding direction.

The drive motor and the angular gear form a structural unit that is housed in a completely closed housing, providing absolute protection against contact and protection against the ingress of dust and water jets. The angular gear assures that the circular blade flanged on the axis rotates at a slower rate but with considerably more torque than the drive motor. The speed of the circular blade is determined by the gear ratio, so that at a brisk working speed a smooth and clean cut surface of the animal tissue is produced and bones are smoothly cleaved without chipping.

In a first embodiment, the working plane is formed by a cutting rail. The animal product to be cut is held and guided along the cutting rail. In the second embodiment, instead of the cutting rail, a cutting plate is inserted, on which the animal product to be cut is placed and guided. The cutting rail or the cutting plate engages with a rear tab behind a slotted hole in the stand, thus forming a vertically adjustable clamping connection. As a result, the distance between the lower perimeter of the circular blade and the cutting rail or cutting plate can be varied so that the depth of the cut in the animal product to be cut can be adjusted to an optimum cutting angle. Here, the cutting rail or cutting plate has a rectangular narrow recess in the form of a blade slot, into which the circular blade can be inserted. Through cuts as well as incisions into the product to be cut are possible.

Advantageously the embodiment of the invention provides a closed blade guard, comprising a covering protective cover in the upper perimeter region of the circular blade and a pivoting crescent-shaped guard in the front perimeter region of the circular blade. Moreover, a gap wedge is mounted between the stand and the circular blade that is positioned at a close distance to the rear perimeter region of the circular blade, in the cutting direction behind the circular blade, and that is in exact alignment with the cutting plane. The gap wedge prevents jamming of the circular blade in the blade slot, which can be caused by the product to be cut. The gap wedge also prevents accidentally touching the circular blade from behind.

As the diameter of the circular blade can decrease during use, the gap wedge can be readjusted accordingly.

The operational area of the circular blade with stand is extended by an additional sliding table, which is held on the cutting plate. This way, the product to be cut can be pushed trough underneath the circular blade. The sliding table can be expanded into a complete portioning unit with a stop and a waste slider. With such a portioning unit, a variety of portions can be cut.

The drive motor is advantageously designed as an electric motor. Compressed air motors or other motors may also be used. In any case, a motor protection switch and an emergency switch, which can rapidly be activated in case of danger or to avoid such a case, are located within convenient reach.

The invention is explained with reference to figures by way of example.

BREIF DESCRIPTION OF THE SEVERAL VIEWS OF THE DRAWING

Figure 2:
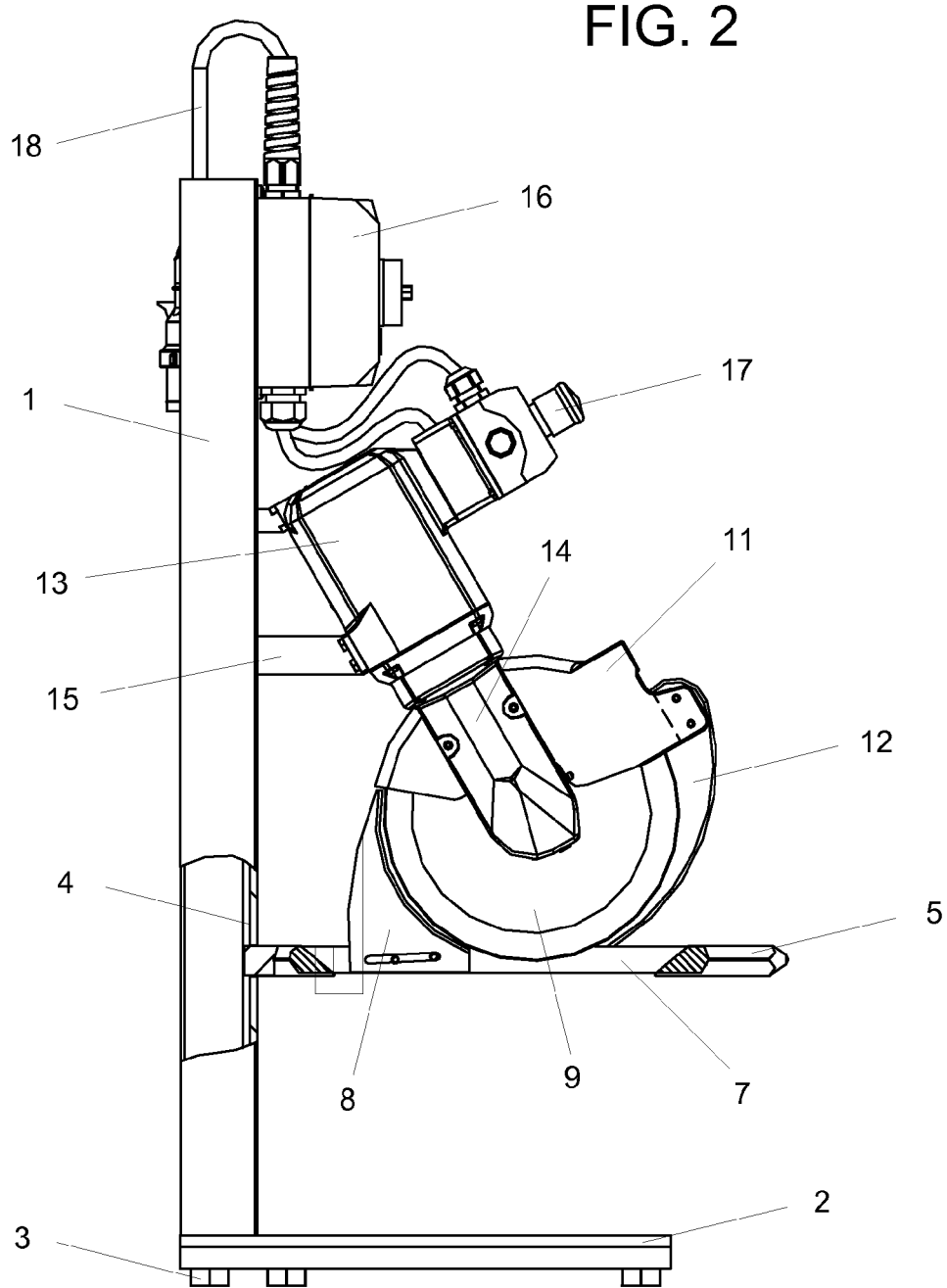
Figure 3:
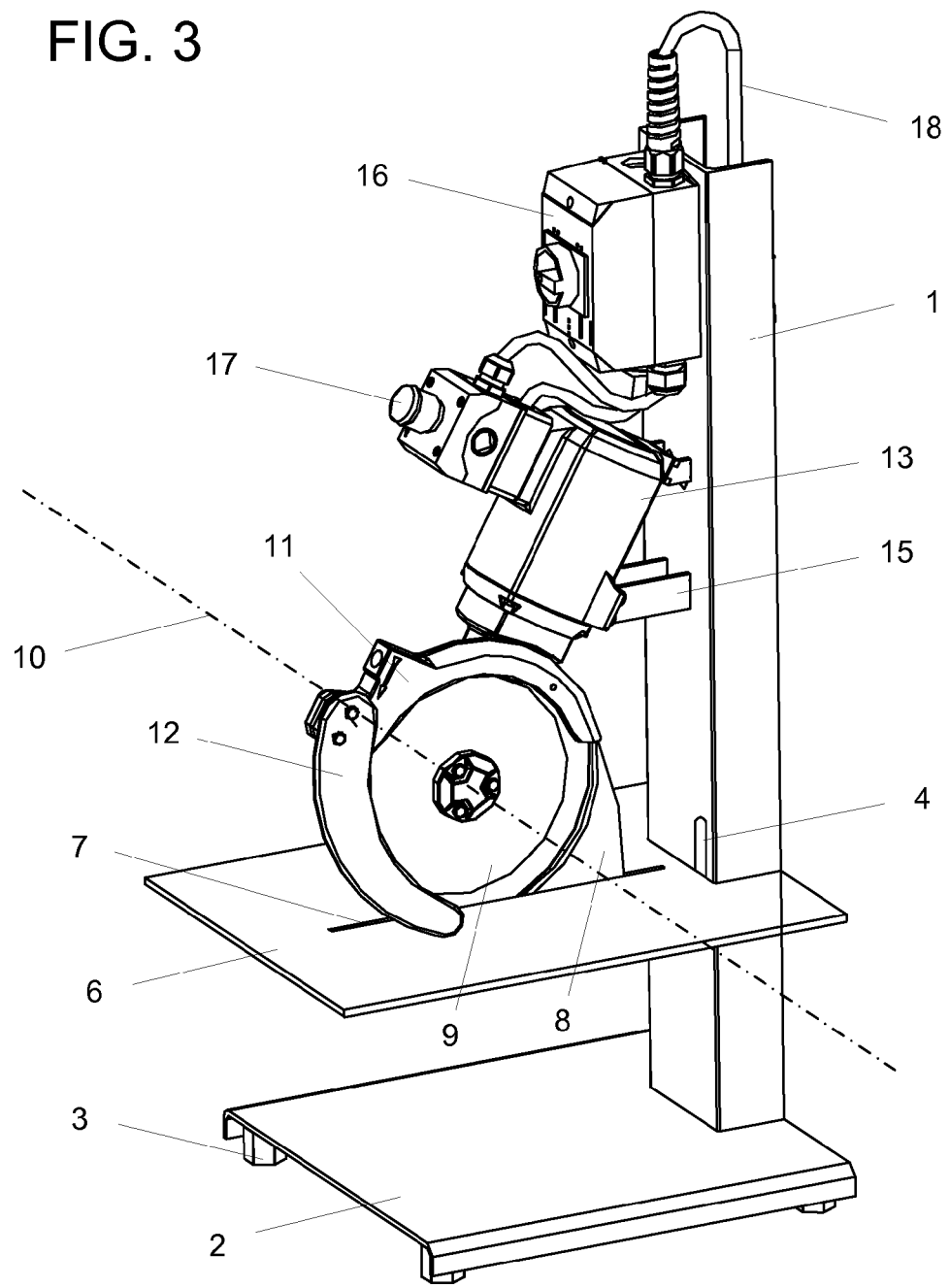
Figure 4:
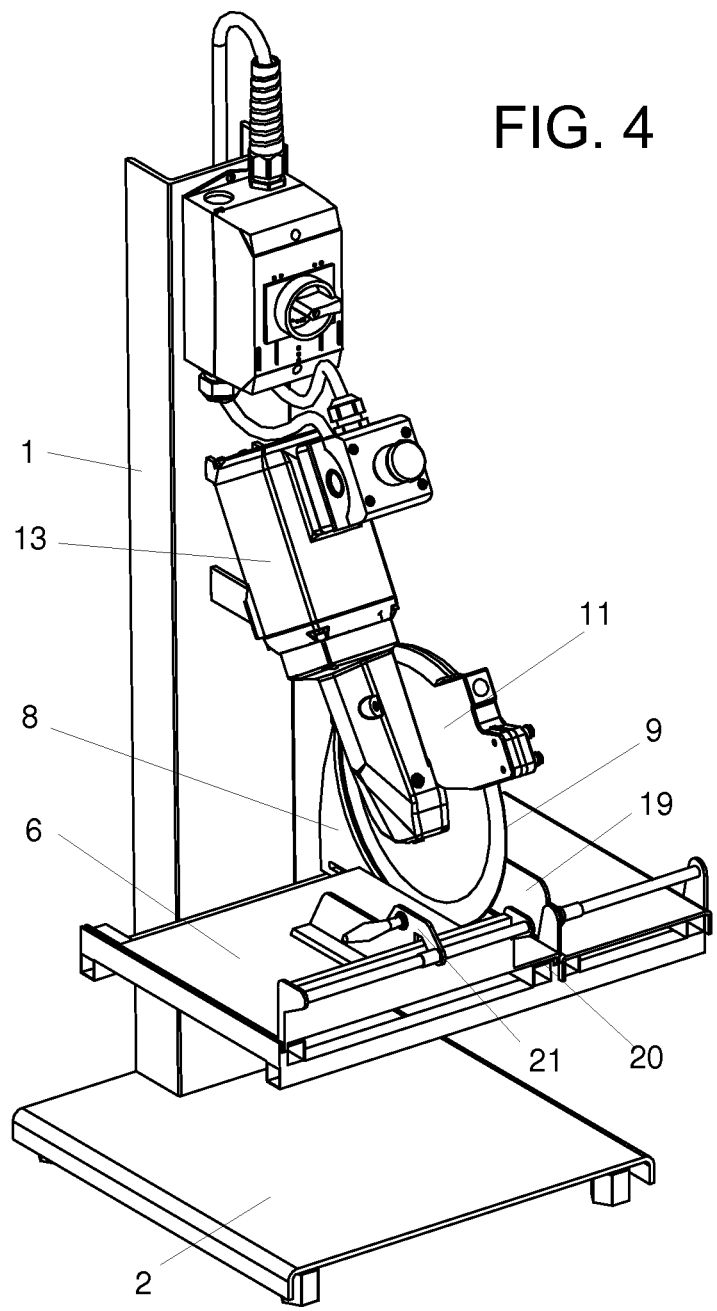

FIG. 1 shows a circular blade with stand with cutting rail in an isometric view.
FIG. 2 shows a circular blade with stand in a side view.
FIG. 3 shows a circular blade with stand with cutting plate in an isometric view.
FIG. 4 shows a circular blade with stand with a cutting plate and a portioning unit.

DESCRIPTION OF THE INVENTION

FIG. 1 shows a circular blade with stand in isometric view, in which the horizontal working plane is formed by a cutting rail 5. Here, the animal product to be cut is held and guided along the cutting rail 5 to the circular blade 9. The cutting rail 5 has a blade slot 7 in its longitudinal axis, so that the circular blade 9 is inserted into the cutting rail 5. The height-adjustability of the cutting rail is described in detail in FIG. 2. The circular blade 9 is flanged to an angular gear 14, which is drivingly connected with the electric motor 13, so that the circular blade 9 rotates about a rotational axis 10 in a vertical cutting plane. The electric motor 13 is fixed to the frame 1 by brackets 15, above the circular blade 9, which results in a space-saving arrangement of the electric motor 13 above the working area. Thus, a free working space is provided on both sides of the circular blade 9 for an optimal ergonomic handling of the animal product to be cut without obstacles, so the product to be cut can be held and guided without strain.

The circular blade 9 is equipped with a closed blade guard comprising a pivotal crescent-shaped guard 12 in the front perimeter region, a covering protective cover 11 in the upper perimeter region and a gap wedge 8 in the rear perimeter region. At the lower end of the stand 1, a base plate 2 is attached, to the underside of which non-slip feet 3 are attached, so that the circular blade with stand can be placed on any work surface which is suitable for operation. At the upper end of the stand 1, a motor protection switch 16 and an emergency switch 17 are arranged, which control the power supply of the electric motor 13 through the supply cable 18.

FIG. 2 shows a side view of the circular blade with stand, which in FIG. 1 is described in detail, showing the angular gear 14, to which the circular blade 9 is flanged. The angular gear 14 is housed in a completely closed housing together with the electric motor 13 and is connected drivingly with the latter.

A vertical section of the stand 1 illustrates how a rear tap of the cutting rail 5 passes through the slotted hole 4 in the stand 1 and engages behind it in such a way that a vertically adjustable clamping connection is established. This way, the cutting depth into the product to be cut can be adjusted.

FIG. 3 shows an isometric view of the circular blade with stand, which in FIG. 1 is described in detail, wherein the horizontal working plane is formed by a cutting plate 6 instead of a cutting rail 5. Here, the animal product to be cut is placed on the cutting plate 6 and guided to the circular blade 9.

The cutting plate 6 has a narrow recess in the form of a blade slot 7 in the longitudinal direction of the vertical cutting plane, so that the circular blade 9 can be inserted into the cutting plate 6. The cutting plate 6 is mounted to the stand 1 in the same height-adjustable manner as the cutting rail 5 so that the distance between the circular blade 9 and the cutting plate 6 is variable, whereby the cutting depth into the material to be cut is adjustable.

FIG. 4 shows the circular blade with stand according to FIG. 3 with an additional portioning unit 20. It is maintained on and slides on the cutting plate 6 and is equipped with a stop 19 and a waste slider 21. This additional portioning unit widens the range of applications for the circular blade with stand.

REFERENCE SIGNS 1 stand
2 base plate
3 foot
4 slotted hole
5 cutting rail
6 cutting plate
7 blade slot
8 gap wedge
9 circular blade
10 rotational axis
11 protective cover
12 crescent-shaped guard
13 drive motor
14 angular gear
15 bracket
16 motor protection switch
17 emergency switch
18 supply cable
19 stop
20 portioning unit
21 waste slider

The invention claimed is:
1. A circular blade assembly, comprising:
a stand supporting a circular blade for cutting up and portioning animal products, said circular blade being rotatably supported about a rotational axis on a vertical cutting plane;
a horizontal working plane disposed to support the animal products to be cut and to guide the products transversely to the vertical cutting plane;
a drive motor with an angular gear connected to drive said circular blade, said drive motor being held in a fixed position completely above said circular blade on said stand to thereby provide a free working area on both sides of said circular blade for an uninhibited handling of the products to be cut.
2. The circular blade assembly according to claim 1, wherein said angular gear is completely closed.

3. The circular blade assembly according to claim 1, wherein said drive motor is an electric motor or a pressurized air motor.

4. The circular blade assembly according to claim 1, wherein said stand is affixed to a base plate, for placement on a working surface selected for operating the assembly.

5. The circular blade assembly according to claim 1, wherein said stand is mounted to another working device.

6. The circular blade assembly according to claim 1, wherein said stand is a narrow plate, which is oriented perpendicular to the guiding direction.

7. The circular blade assembly according to claim 1, wherein said stand is a tube.

8. The circular blade assembly according to claim 1, wherein said stand is formed with a triangular front.

9. The circular blade assembly according to claim 1, wherein said working plane is formed by a cutting rail along which the product to be cut is guided during cutting.

10. The circular blade assembly according to claim 9, wherein said cutting rail is height-adjustably mounted on said stand, for adjusting a distance between said circular blade and said working plane, to thereby adjust a cutting depth into the product to be cut.

11. The circular blade assembly according to claim 9, wherein said cutting rail is formed with a blade slot for enabling insertion of said circular blade.

12. The circular blade assembly according to claim 1, wherein said working plane is formed by a cutting plate, on which the material to be cut is placed and guided.

13. The circular blade assembly according to claim 12, wherein said cutting plate is height-adjustably mounted on said stand, for adjusting a distance between said circular blade and said working plane, to thereby adjust a cutting depth into the product to be cut.

14. The circular blade assembly according to claim 12, wherein said cutting plate is formed with a blade slot for enabling insertion of said circular blade.

15. The circular blade assembly according to claim 1, which comprises a protective cover disposed at an upper perimeter region of said circular blade and a pivotal crescent-shaped guard arranged at a front perimeter region of said circular blade.

16. The circular blade assembly according to claim 1, which comprises a gap wedge arranged between said stand and said circular blade, affixed at a close distance to said blade.

17. The circular blade assembly according to claim 16, wherein said gap wedge is adjustable.

18. The circular blade assembly according to claim 1, wherein said working plane is formed by a cutting plate, and which further comprises a sliding table disposed on said cutting plate.

19. The circular blade assembly according to claim 18, wherein said sliding table is expanded into a portioning device with stop and waste slider.

20. The circular blade assembly according to claim 1, which comprises a motor protection switch and an emergency switch disposed on said drive motor for convenient reach by an operator of the assembly.

* * * * *